United States Patent
Lin et al.

(10) Patent No.: US 12,229,979 B2
(45) Date of Patent: Feb. 18, 2025

(54) REAL-TIME GROUND FUSION METHOD AND SYSTEM BASED ON BINOCULAR STEREO VISION, AND INTELLIGENT TERMINAL

(71) Applicants: Beijing Smarter Eye Technology Co. Ltd, Beijing (CN); Shenzhen Pengcheng Electric Group Co., Ltd., Beijing (CN); Shenzhen Talent Database Data Technology Co., Ltd, Beijing (CN)

(72) Inventors: Ruibin Lin, Beijing (CN); Hua Chai, Beijing (CN); Zhipeng Xiao, Beijing (CN); Jun Liao, Beijing (CN); Bin Chen, Beijing (CN); Jian Li, Beijing (CN); Ran Meng, Beijing (CN); Ya Liu, Beijing (CN); Huosheng Xu, Beijing (CN)

(73) Assignees: Beijing Smarter Eye Technology Co. Ltd, Beijing (CN); Shenzhen Pengcheng Electric Group Co., Ltd, Beijing (CN); Shenzhen Talent Database Data Technology Co., Ltd, Beijing (CN)

( * ) Notice: Subject to any disclaimer, the term of this patent is extended or adjusted under 35 U.S.C. 154(b) by 415 days.

(21) Appl. No.: 17/658,973

(22) Filed: Apr. 12, 2022

(65) Prior Publication Data

US 2023/0147557 A1    May 11, 2023

(30) Foreign Application Priority Data

Nov. 10, 2021    (CN) .......................... 202111324098.2

(51) Int. Cl.
*G02B 27/10*    (2006.01)
*G06T 7/593*    (2017.01)
(Continued)

(52) U.S. Cl.
CPC ............ *G06T 7/593* (2017.01); *G06V 10/806* (2022.01); *G06V 10/82* (2022.01); *H04N 13/128* (2018.05);
(Continued)

(58) Field of Classification Search
CPC ..... G01S 17/89; B60W 30/09; B60W 60/001; B60W 40/02; G06V 20/58; G06V 10/751;
(Continued)

(56) References Cited

U.S. PATENT DOCUMENTS

2022/0066021 A1*    3/2022    Fu .......................... G01S 13/589

* cited by examiner

Primary Examiner — Phuoc H Doan
(74) Attorney, Agent, or Firm — NKL Law; Allen Xue (57) ABSTRACT

A real-time ground fusion system is based on binocular stereo vision and an intelligent terminal. The method for accomplish real-time ground fusion includes: S1 of obtaining a disparity map about a same road scenario, and converting a disparity map in a target region into a 3D point cloud; S2 of performing pose conversion on a current frame and a next frame adjacent to the current frame, and performing inverse conversion on a 3D point cloud of the current frame; and S3 of repeating S2 with each frame in the target region as the current frame, so as to achieve ground fusion. Through the conversion and fusion of adjacent frames, holes caused by the projection of the disparity map can be filled to assist driving and output accurate height data, thereby improving comfortableness.

15 Claims, 4 Drawing Sheets

S1 — obtaining a disparity map about a same road scenario, and converting a disparity map in a target region into a 3D point cloud S2 — performing pose conversion on a current frame and a next frame adjacent to the current frame, and performing inverse conversion on a 3D point cloud of the current frame S3 — repeating S2 with each frame in the target region as the current frame, so as to achieve ground fusion (51) Int. Cl.
*G06V 10/80* (2022.01)
*G06V 10/82* (2022.01)
*H04N 13/128* (2018.01)

(52) U.S. Cl.
CPC ............... *G06T 2207/10028* (2013.01); *G06T 2207/20081* (2013.01); *G06T 2207/20084* (2013.01)

(58) Field of Classification Search
CPC ........... G06V 10/62; G06T 7/85; G06T 7/246; G06T 7/30; H04N 5/2258
See application file for complete search history.

REAL-TIME GROUND FUSION METHOD AND SYSTEM BASED ON BINOCULAR STEREO VISION, AND INTELLIGENT TERMINAL

TECHNICAL FIELD

The present disclosure relates to the field of assistant driving technology, in particular to a real-time ground fusion method and a real-time ground fusion system based on binocular stereo vision, and an intelligent terminal.

BACKGROUND

Along with the development of the automatic driving technology, the security and comfortableness of a vehicle are highly demanded. In assistant driving, a road surface height is an important parameter for adaptively adjusting a suspension of a vehicle. However, when an original binocular disparity map is back-projected to a three-dimensional (3D) point cloud, a hole may occur, and it may become more and more obvious along with an increase in a distance. At this time, the detection accuracy of the road surface height is relatively low, and the comfortableness of the vehicle may be adversely affected.

Hence, there is an urgent need to provide a road surface height detection method based on binocular stereo vision, so as to provide accurate height data in the assistant driving and facilitate the adaptive adjustment of the suspension, thereby to improve the comfortableness of the vehicle

SUMMARY

An object of the present disclosure is to provide a real-time ground fusion method and a real-time ground fusion system based on binocular stereo vision, and an intelligent terminal, so as to fill the hole caused by the projection of the disparity map, and output the accurate height data, thereby to improve the comfortableness of a vehicle in the assistant driving.

In one aspect, the present disclosure provides in some embodiments a real-time ground fusion method based on binocular stereo vision, including: S1 of obtaining a disparity map about a same road scenario, and converting a disparity map in a target region into a 3D point cloud; S2 of performing pose conversion on a current frame and a next frame adjacent to the current frame, and performing inverse conversion on a 3D point cloud of the current frame; and S3 of repeating S2 with each frame in the target region as the current frame, so as to achieve ground fusion.

In a possible embodiment of the present disclosure, the disparity map in the target region is converted into the 3D point cloud through $$\begin{bmatrix} X \\ Y \\ Z \\ W \end{bmatrix} = \begin{bmatrix} 1 & 0 & 0 & -cx \\ 0 & 1 & 0 & -cy \\ 0 & 0 & 0 & f \\ 0 & 0 & -1/\text{baseline} & (cx - c'x)/\text{baseline} \end{bmatrix} \begin{bmatrix} u \\ v \\ \text{disparity} \\ 1 \end{bmatrix},$$

where u and v represent coordinates of a pixel in an image, disparity represents a disparity value of a corresponding pixel, f represents a focal length of a camera, cx and cy represent coordinates of an optical center of a left camera, c'x represents a coordinate of an optical center of a right camera, baseline represents a distance between the optical center of the left camera and the optical center of the right camera, and X, Y, Z and W represent homogeneous coordinates in a 3D coordinate system.

In a possible embodiment of the present disclosure, the pose conversion is performed on the current frame and the next frame adjacent to the current frame through $$\begin{bmatrix} p'_{world} \\ 1 \end{bmatrix} = \begin{bmatrix} R & t \\ 0 & 1 \end{bmatrix} \begin{bmatrix} p_{camera} \\ 1 \end{bmatrix},$$

where $P_{camera}$ represents 3D coordinates in a camera coordinate system, $P'_{world}$ represents coordinates in a world coordinate system after the pose conversion, R represents a rotation matrix for two frames, and t represents a translation matrix for two frames.

In a possible embodiment of the present disclosure, the rotation matrix and the translation matrix are obtained through: extracting feature points of the two frames, and matching the two frames in accordance with the extracted feature points; obtaining a matching relation, and calculating essential matrices for data of the two frames; performing calculation on randomly-selected N point pairs through an RANSAC algorithm, so as to obtain an optimal essential matrix; and performing Singular Value Decomposition (SVD) on the optimal essential matrix, so as to obtain the rotation matrix and the translation matrix for the pose conversion.

In a possible embodiment of the present disclosure, the feature points of the two frames are calculated through a Functional Link Artificial Neural Network (FLANN) nearest neighbor matching algorithm.

In a possible embodiment of the present disclosure, the calculating the essential matrices for the data of two frames includes, when a pair of matching points $p_1$ and $p_2$ meet $p_2^T K^{-T} t^{\wedge} R K^{-1} p_1 = 0$ in accordance with a geometrical relationship, determining $E = t^{\wedge} R$ as the essential matrix, where K represents a camera intrinsic parameter matrix, t represents the translation matrix for the two frames, and R represents the rotation matrix for the two frames.

In a possible embodiment of the present disclosure, N is 8.

In another aspect, the present disclosure provides in some embodiments a real-time ground fusion system based on binocular stereo vision, including: a data obtaining unit configured to obtain a disparity map about a same road scenario, and convert a disparity map in a target region into a 3D point cloud; a pose conversion unit configured to perform pose conversion on a current frame and a next frame adjacent to the current frame, and perform inverse conversion on a 3D point cloud of the current frame; and a ground fusion unit configured to perform the pose conversion and the inverse conversion repeatedly with each frame in the target region as the current frame, so as to achieve ground fusion.

In yet another aspect, the present disclosure provides in some embodiments a road surface height detection system based on binocular stereo vision, including: a disparity map obtaining unit configured to obtain a left-eye image and a right-eye image about a same road scenario, and process the left-eye image and the right-eye image to obtain a dense disparity map of the road scenario; a point cloud information conversion unit configured to convert image information in a target region into 3D point cloud information in a world coordinate system in accordance with the dense disparity map; a densification unit configured to divide a 3D point cloud in the target region into grids, and perform densification on a grid region with a hole; and a detection result output unit configured to extract a road surface grid region in the grid after the densification, obtain a height of a corresponding grid through counting heights of data points, and output the height of the corresponding grid, so as to generate a grid height map for a road surface height.

In still yet another aspect, the present disclosure provides in some embodiments an intelligent terminal, including a data collection device, a processor and a memory. The data collection device is configured to collect data, the memory is configured to store therein one or more program instructions, and the processor is configured to execute the one or more program instructions, so as to implement the above-mentioned method.

In still yet another aspect, the present disclosure provides in some embodiments a computer-readable storage medium storing therein one or more program instructions. The one or more program instructions is executed to implement the above-mentioned method.

According to the real-time ground fusion method in the embodiments of the present disclosure, the disparity map about the same road scenario is obtained, and the disparity map in the target region is converted into the 3D point cloud. Next, the pose conversion is performed on the current frame and the next frame adjacent to the current frame, and the inverse conversion is performed on the 3D point cloud of the current frame. Then, the pose conversion and the inverse conversion are performed repeatedly with each frame in the target region as the current frame, so as to achieve ground fusion. Through the conversion and the fusion of the two frames, it is able to fill a hole caused by the projection of the disparity map in the assistant driving, and output accurate height data, thereby to improve the comfortableness.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

The structure, scale and size shown in the drawings are merely provided to facilitate the understanding of the contents disclosed in the description but shall not be construed as limiting the scope of the present disclosure, so they has not substantial meanings technically. Any modification on the structure, any change to the scale or any adjustment on the size shall also fall within the scope of the present disclosure in the case of not influencing the effects and the purposes of the present disclosure.

DETAILED DESCRIPTION

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

A camera is an indispensable member for detecting an obstacle. A binocular stereo camera is used to provide accurate point cloud data within a short range, so it is very suitable to detect a road surface height. A suspension may be adaptively adjusted in accordance with information about the road surface height, so as to improve the comfortableness. An object of the present disclosure is to provide a real-time ground fusion method based on binocular stereo vision, so as to fuse the point cloud information about multiple frames, and fill a hole in the 3D point cloud, thereby to improve a detection effect and facilitate the adjustment of the suspension.

Figure 1:
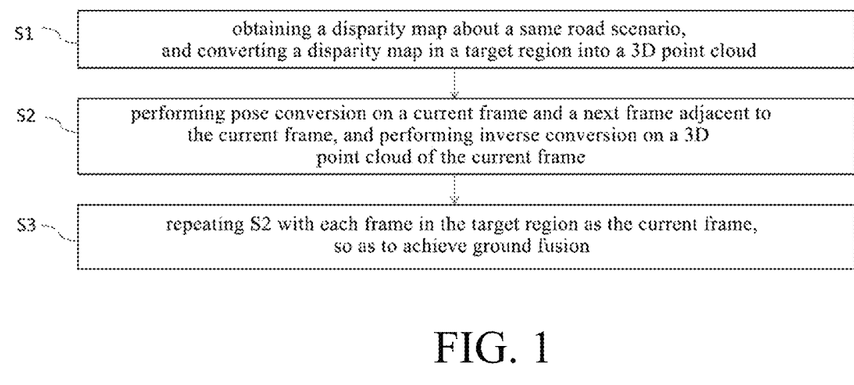
FIG. 1 is a flow chart of a real-time ground fusion method based on binocular stereo vision according to one embodiment of the present disclosure.

As shown in FIG. 1, the present disclosure provides in some embodiments a real-time ground fusion method based on binocular stereo vision, which includes the following steps.

S1: obtaining a disparity map about a same road scenario, and converting a disparity map in a target region into a 3D point cloud.

To be specific, the disparity map in the target region is converted into the 3D point cloud through $$\begin{bmatrix} X \\ Y \\ Z \\ W \end{bmatrix} = \begin{bmatrix} 1 & 0 & 0 & -cx \\ 0 & 1 & 0 & -cy \\ 0 & 0 & 0 & f \\ 0 & 0 & -1/\text{baselne} & (cx - c'x)/\text{baseline} \end{bmatrix} \begin{bmatrix} u \\ v \\ \text{disparity} \\ 1 \end{bmatrix},$$

where u and v represent coordinates of a pixel in an image, disparity represents a disparity value of a corresponding pixel, f represents a focal length of a camera, cx and cy represent coordinates of an optical center of a left camera, c'x represents a coordinate of an optical center of a right camera, baseline represents a distance between the optical center of the left camera and the optical center of the right camera, and X, Y, Z and W represent homogeneous coordinates in a 3D coordinate system.

Figure 2:
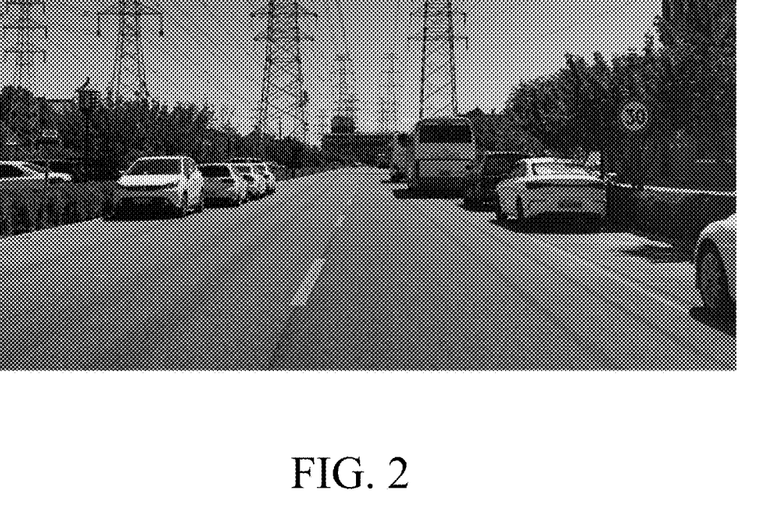
FIG. 2 is a view showing an original image collected by a binocular camera.
Figure 3:
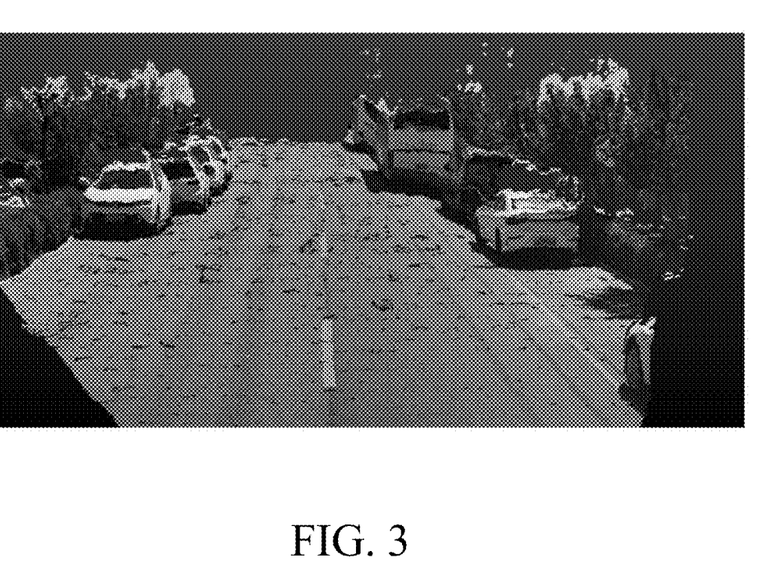
FIG. 3 is a view showing a 3D point cloud into which the original image in FIG. 2 is converted.

In an actual scenario, a collected original image is shown in FIG. 2. When the disparity map is converted into the 3D point cloud through the above formula, as shown in FIG. 3, some holes may occur for outputted ground information, and the larger the distance, the more obvious the hole. At this time, it is necessary to fill this holes subsequently.

S2: performing pose conversion on a current frame and a next frame adjacent to the current frame, and performing inverse conversion on a 3D point cloud of the current frame.

Figure 4:
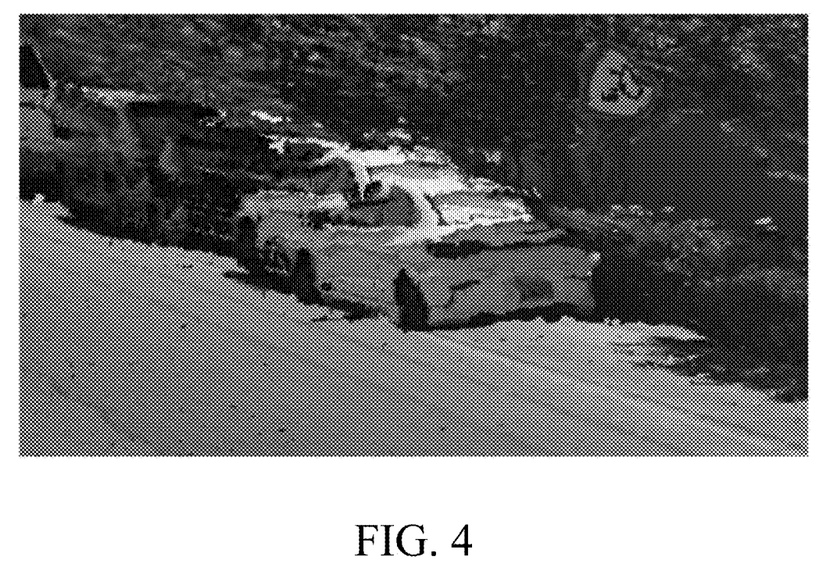
FIG. 4 is a view showing a situation where misplacement occurs for the point cloud.

Slight fluctuation occurs for a vehicle during the driving. When a vehicle motion model is considered as planar motion and the data for two adjacent frames is fused, misplacement may occur for the point cloud, as shown in FIG. 4.

The pose conversion is performed on the current frame and the next frame adjacent to the current frame through $$\begin{bmatrix} p'_{world} \\ 1 \end{bmatrix} = \begin{bmatrix} R & t \\ 0 & 1 \end{bmatrix} \begin{bmatrix} p_{camera} \\ 1 \end{bmatrix},$$

where $P_{camera}$ represents 3D coordinates in a camera coordinate system, $P'_{world}$ represents coordinates in a world coordinate system after the pose conversion, R represents a rotation matrix for two frames, and t represents a translation matrix for two frames.

The transfer matrices R and t for the two frames may be obtained through a visual odometer. In other words, the rotation matrix and the translation matrix are obtained through: extracting feature points of the two frames, and matching the two frames in accordance with the extracted feature points; obtaining a matching relation, and calculating essential matrices for data of the two frames; performing calculation on randomly-selected 8 point pairs through an RANSAC algorithm, so as to obtain an optimal essential matrix; and performing SVD on the optimal essential matrix, so as to obtain the rotation matrix and the translation matrix for the pose conversion.

In order to improve the real-time performance of the algorithm, the feature points of the two frames are calculated through an FLANN nearest neighbor matching algorithm.

To be specific, when a pair of matching points $p_1$ and $p_2$ meet $p_2^T K^{-T} \hat{t} R K^{-1} p_1 = 0$ in accordance with a geometrical relationship, $E = \hat{t} R$ may be determined as the essential matrix, where K represents a camera intrinsic parameter matrix, t represents the translation matrix for the two frames, and R represents the rotation matrix for the two frames.

The inverse conversion may be performed on the point cloud of the current frame, i.e., an inverse matrix of a matrix T obtained through combining R and t may be obtained through S2, so as to eliminate the misplacement caused by the rotation and translation between the two frames.

S3: repeating S2 with each frame in the target region as the current frame, so as to achieve ground fusion.

Figure 5:
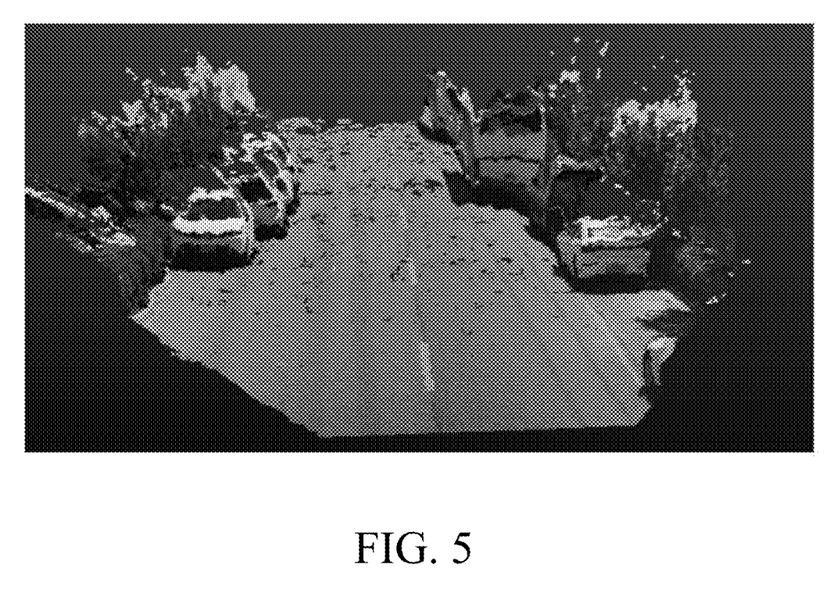
FIG. 5 is a view showing a point cloud for a single frame.
Figure 6:
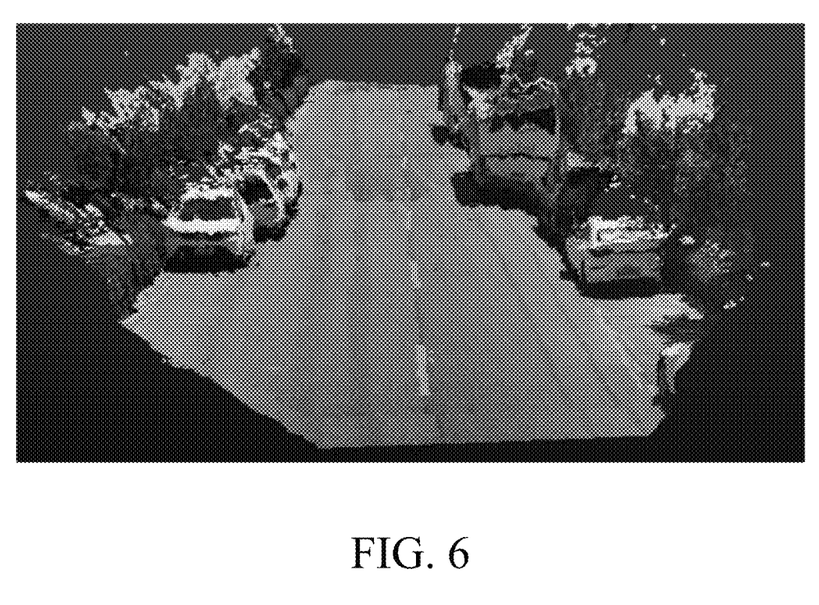
FIG. 6 is a view showing a point cloud for fused frames.

Through comparing FIG. 5 with FIG. 6, after the fusion of the multiple frames, it is able to reduce the quantity of holes in the road surface, thereby to improve the quality of the space information in the scenario.

According to the real-time ground fusion method based on the binocular stereo vision in the embodiments of the present disclosure, the disparity map about the same road scenario is obtained, and the disparity map in the target region is converted into the 3D point cloud. Next, the pose conversion is performed on the current frame and the next frame adjacent to the current frame, and the inverse conversion is performed on the 3D point cloud of the current frame. Then, the pose conversion and the inverse conversion are performed repeatedly with each frame in the target region as the current frame, so as to achieve ground fusion. As a result, through the conversion and fusion of the adjacent frames, it is able to fill the holes caused by the projection of the disparity map in the assistant driving, and output the accurate height data, thereby to improve the comfortableness.

Figure 7:
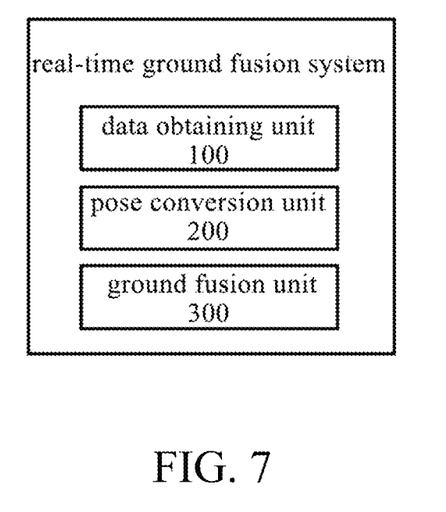
FIG. 7 is a block diagram of a real-time ground fusion system based on binocular stereo vision according to one embodiment of the present disclosure.

The present disclosure further provides in some embodiments a real-time ground fusion system based on binocular stereo vision which, as shown in FIG. 7, includes: a data obtaining unit 100 configured to obtain a disparity map about a same road scenario, and convert a disparity map in a target region into a 3D point cloud; a pose conversion unit 200 configured to perform pose conversion on a current frame and a next frame adjacent to the current frame, and perform inverse conversion on a 3D point cloud of the current frame; and a ground fusion unit 300 configured to perform the pose conversion and the inverse conversion repeatedly with each frame in the target region as the current frame, so as to achieve ground fusion.

According to the real-time ground fusion system based on the binocular stereo vision in the embodiments of the present disclosure, the disparity map about the same road scenario is obtained, and the disparity map in the target region is converted into the 3D point cloud. Next, the pose conversion is performed on the current frame and the next frame adjacent to the current frame, and the inverse conversion is performed on the 3D point cloud of the current frame. Then, the pose conversion and the inverse conversion are performed repeatedly with each frame in the target region as the current frame, so as to achieve ground fusion. As a result, through the conversion and fusion of the adjacent frames, it is able to fill the holes caused by the projection of the disparity map in the assistant driving, and output the accurate height data, thereby to improve the comfortableness.

The present disclosure further provides in some embodiments an intelligent terminal, which includes a data collection device, a processor and a memory. The data collection device is configured to collect data, the memory is configured to store therein one or more program instructions, and the processor is configured to execute the one or more program instructions so as to implement the above-mentioned real-time ground fusion method.

The present disclosure further provides in some embodiments a computer-readable storage medium storing therein one or more program instructions. The one or more program instructions is executed by the topographic environment detection system so as to implement the above-mentioned real-time ground fusion method.

In the embodiments of the present disclosure, the processor may be an integrated circuit (IC) having a signal processing capability. The processor may be a general-purpose processor, a Digital Signal Processor (DSP), an Application Specific Integrated Circuit (ASIC), a Field Programmable Gate Array (FPGA) or any other programmable logic element, discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as a Random Access Memory (RAM), a flash memory, a Read-Only Memory (ROM), a Programmable ROM (PROM), an Electrically Erasable PROM (EEPROM), or a register. The processor may read information stored in the storage medium so as to implement the steps of the method in conjunction with the hardware.

The storage medium may be a memory, e.g., a volatile, a nonvolatile memory, or both.

The nonvolatile memory may be an ROM, a PROM, an EPROM, an EEPROM or a flash disk.

The volatile memory may be an RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM).

The storage medium in the embodiments of the present disclosure intends to include, but not limited to, the above-mentioned and any other appropriate memories.

It should be appreciated that, in one or more examples, the functions mentioned in the embodiments of the present disclosure may be achieved through hardware in conjunction with software. For the implementation, the corresponding functions may be stored in a computer-readable medium, or may be transmitted as one or more instructions on the computer-readable medium. The computer-readable medium may include a computer-readable storage medium and a communication medium. The communication medium may include any medium capable of transmitting a computer program from one place to another place. The storage medium may be any available medium capable of being accessed by a general-purpose or special-purpose computer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

The invention claimed is:

1. A real-time ground fusion method based on binocular stereo vision, comprising:
S1 of obtaining a disparity map for a same road scenario, and converting a disparity map in a target region into a three-dimensional (3D) point cloud;
S2 of performing pose conversion on a current frame and a next frame adjacent to the current frame, and performing inverse conversion on a 3D point cloud of the current frame; and
S3 of repeating S2 with each frame in the target region as the current frame, so as to achieve ground fusion,
wherein the disparity map in the target region is converted into the 3D point cloud according to $$\begin{bmatrix} X \\ Y \\ Z \\ W \end{bmatrix} = \begin{bmatrix} 1 & 0 & 0 & -cx \\ 0 & 1 & 0 & -cy \\ 0 & 0 & 0 & f \\ 0 & 0 & -1/\text{baseline} & (cx-c'x)/\text{baseline} \end{bmatrix} \begin{bmatrix} u \\ v \\ \text{disparity} \\ 1 \end{bmatrix},$$

wherein u and y represent coordinates of a pixel in an image, disparity represents a disparity value of a corresponding pixel, f represents a focal length of a camera, cx and cy represent coordinates of an optical center of a left camera, c'x represents a coordinate of an optical center of a right camera, baseline represents a distance between the optical center of the left camera and the optical center of the right camera, and X, Y, Z and W represent homogeneous coordinates in a 3D coordinate system.

2. The real-time ground fusion method according to claim 1, wherein the pose conversion is performed on the current frame and the next frame adjacent to the current frame according to $$\begin{bmatrix} p'_{world} \\ 1 \end{bmatrix} = \begin{bmatrix} R & t \\ 0 & 1 \end{bmatrix} \begin{bmatrix} p_{camera} \\ 1 \end{bmatrix},$$

wherein $P_{camera}$ represents 3D coordinates in a camera coordinate system, $P'_{world}$ represents coordinates in a world coordinate system after the pose conversion, R represents a rotation matrix for two frames, and t represents a translation matrix for the two frames.

3. The real-time ground fusion method according to claim 2, wherein the rotation matrix and the translation matrix are obtained by:
extracting feature points of the two frames, and matching the two frames in accordance with the extracted feature points;
obtaining a matching relation, and calculating essential matrices for data of the two frames;
performing calculation on randomly-selected N point pairs through an RANSAC algorithm, so as to obtain an optimal essential matrix; and
performing Singular Value Decomposition (SVD) on the optimal essential matrix to obtain the rotation matrix and the translation matrix for the pose conversion.

4. The real-time ground fusion method according to claim 3, wherein the feature points of the two frames are calculated according to a Functional Link Artificial Neural Network (FLANN) nearest neighbor matching algorithm.

5. The real-time ground fusion method according to claim 3, wherein the calculating the essential matrices for the data of the two frames comprises, when a pair of matching points $p_1$ and $p_2$ satisfy $p_2^T K^{-T} t^\wedge R K^{-1} p_1 = 0$ in accordance with a geometrical relationship, determining $E = t^\wedge R$ as the essential matrix, wherein K represents a camera intrinsic parameter matrix.

6. The real-time ground fusion method according to claim 3, wherein N is 8.

7. An intelligent terminal, comprising a data collection device, a processor and a memory, wherein the data collection device is configured to collect data, the memory is configured to store therein one or more program instructions, and the processor is configured to execute the one or more program instructions to implement the real-time ground fusion method according to claim 1.

8. A non-transitory computer-readable storage medium storing therein one or more program instructions, wherein the one or more program instructions is executed to implement the real-time ground fusion method according to claim 1.

9. A real-time ground fusion method based on binocular stereo vision, comprising:
S1 of obtaining a disparity map for a same road scenario, and converting a disparity map in a target region into a three-dimensional (3D) point cloud;
S2 of performing pose conversion on a current frame and a next frame adjacent to the current frame, and performing inverse conversion on a 3D point cloud of the current frame; and
S3 of repeating S2 with each frame in the target region as the current frame to achieve ground fusion,
wherein the pose conversion is performed on the current frame and the next frame adjacent to the current frame according to $$\begin{bmatrix} p'_{world} \\ 1 \end{bmatrix} = \begin{bmatrix} R & t \\ 0 & 1 \end{bmatrix} \begin{bmatrix} p_{camera} \\ 1 \end{bmatrix},$$

wherein $P_{camera}$ represents 3D coordinates in a camera coordinate system, $P'_{world}$ represents coordinates in a world coordinate system after the pose conversion, R represents a rotation matrix for two frames, and t represents a translation matrix for the two frames.

10. The real-time ground fusion method according to claim 9, wherein the rotation matrix and the translation matrix are obtained by:
- extracting feature points of the two frames, and matching the two frames in accordance with the extracted feature points;
- obtaining a matching relation, and calculating essential matrices for data of the two frames;
- performing calculation on randomly-selected N point pairs through an RANSAC algorithm to obtain an optimal essential matrix; and
- performing Singular Value Decomposition (SVD) on the optimal essential matrix to obtain the rotation matrix and the translation matrix for the pose conversion.

11. The real-time ground fusion method according to claim 10, wherein the feature points of the two frames are calculated according to a Functional Link Artificial Neural Network (FLANN) nearest neighbor matching algorithm.

12. The real-time ground fusion method according to claim 10, wherein the calculating the essential matrices for the data of the two frames comprises, when a pair of matching points $p_1$ and $p_2$ satisfy $p_2^T K^{-T} \hat{t} R K^{-1} p_1 = 0$ in accordance with a geometrical relationship, determining $E = \hat{t} R$ as the essential matrix, wherein K represents a camera intrinsic parameter matrix.

13. The real-time ground fusion method according to claim 10, wherein N is 8.

14. An intelligent terminal, comprising a data collection device, a processor and a memory, wherein the data collection device is configured to collect data, the memory is configured to store therein one or more program instructions, and the processor is configured to execute the one or more program instructions to implement the real-time ground fusion method according to claim 9.

15. A non-transitory computer-readable storage medium storing therein one or more program instructions, wherein the one or more program instructions is executed to implement the real-time ground fusion method according to claim 9.

* * * * *